(12) United States Patent
Bijwaard et al.

(10) Patent No.: US 8,102,846 B2
(45) Date of Patent: Jan. 24, 2012

(54) METHOD AND APPARATUS FOR MANAGING A MULTICAST TREE USING A MULTICAST TREE MANAGER AND A CONTENT SERVER

(75) Inventors: Dennis Johannes Adrianus Bijwaard, Enschede (NL); Harmanus van Tellingen, Naarden (NL)

(73) Assignee: Alcatel Lucent, Paris (FR)

( * ) Notice: Subject to any disclaimer, the term of this patent is extended or adjusted under 35 U.S.C. 154(b) by 931 days.

(21) Appl. No.: 11/096,218

(22) Filed: Mar. 31, 2005

(65) Prior Publication Data
US 2006/0221859 A1 Oct. 5, 2006

(51) Int. Cl.
H04L 12/28 (2006.01)
H04L 12/16 (2006.01)
H04L 12/50 (2006.01)
H04Q 11/00 (2006.01)
H04J 3/16 (2006.01)
H04J 3/22 (2006.01)

(52) U.S. Cl. ..... 370/390; 370/270; 370/370; 370/395.5; 370/469

(58) Field of Classification Search .......... None
See application file for complete search history.

(56) References Cited

U.S. PATENT DOCUMENTS

| | | | |
|---|---|---|---|
| 5,355,371 A * | 10/1994 | Auerbach et al. | 370/255 |
| 5,905,871 A * | 5/1999 | Buskens et al. | 709/245 |
| 6,181,697 B1 | 1/2001 | Nurenberg et al. | |
| 6,324,575 B1 | 11/2001 | Jain et al. | |
| 6,507,863 B2 | 1/2003 | Novaes | |
| 6,529,882 B1 | 3/2003 | Park et al. | |
| 6,594,703 B1 | 7/2003 | Li | |
| 6,606,706 B1 | 8/2003 | Li | |
| 6,636,895 B1 | 10/2003 | Li et al. | |
| 6,639,918 B1 | 10/2003 | Hauck et al. | |
| 6,728,777 B1 * | 4/2004 | Lee et al. | 709/238 |
| 6,853,639 B1 | 2/2005 | Watanuki et al. | |
| 6,937,574 B1 | 8/2005 | Delaney et al. | |
| 6,965,883 B2 * | 11/2005 | Xu et al. | 705/418 |
| 7,031,308 B2 * | 4/2006 | Garcia-Luna-Aceves et al. | 370/390 |

(Continued)

FOREIGN PATENT DOCUMENTS

EP 1379038 A1 1/2004

(Continued)

OTHER PUBLICATIONS

Harris, Michael, "OSPF Notes", Nov. 8, 2000, STChas.edu, all pages.*

(Continued)

*Primary Examiner* — Kwang B Yao
*Assistant Examiner* — Adam Duda
(74) *Attorney, Agent, or Firm* — Wall & Tong, LLP (57) ABSTRACT

The invention comprises a method and apparatus for managing a multicast tree using SIP, SOAP, HTTP, or similar signaling between a multicast receiver (e.g., user device) and a third party system (e.g., a content provider system). The method includes receiving at least one request for modifying the multicast tree, determining at least one multicast tree change in response to the at least one request for modifying the multicast tree (where the at least one multicast tree change is operable for modifying the multicast tree according to the at least one request), and generating at least one message operable for implementing the at least one multicast tree change. The at least one request and the at least one message are implemented in a manner tending to minimize consumption of network resources.

22 Claims, 6 Drawing Sheets

U.S. PATENT DOCUMENTS

| | | | |
|---|---|---|---|
| 7,085,244 B2* | 8/2006 | Koskelainen et al. | 370/261 |
| 7,502,926 B2 | 3/2009 | Luo et al. | |
| 7,587,591 B2 | 9/2009 | Lebovitz et al. | |
| 7,620,045 B2 | 11/2009 | Igarashi et al. | |
| 7,701,937 B2 | 4/2010 | Narayanan et al. | |
| 7,936,752 B2 | 5/2011 | Boers et al. | |
| 7,941,826 B2 | 5/2011 | Liu et al. | |
| 7,949,737 B2 | 5/2011 | Tan | |
| 8,006,098 B2 | 8/2011 | Aupperle et al. | |
| 2004/0088309 A1* | 5/2004 | Koh et al. | 707/100 |
| 2004/0125756 A1 | 7/2004 | Lepore et al. | |
| 2008/0016191 A1 | 1/2008 | Bijwaard | |

FOREIGN PATENT DOCUMENTS

| | | |
|---|---|---|
| JP | 2006324981 A | 11/2006 |

OTHER PUBLICATIONS

"ENME: An Enriched Media Application Utilizing Context for Session Mobility; Technical and Human Issues," EUC Workshops, 2005, pp. 316-325.

Li, Victor et al., "Internet Multicast Routing and Transport Control Protocols," Proceedings of the IEEE, vol. 90, No. 3, Mar. 2002, pp. 360-391.

* cited by examiner

METHOD AND APPARATUS FOR MANAGING A MULTICAST TREE USING A MULTICAST TREE MANAGER AND A CONTENT SERVER

FIELD OF THE INVENTION

The invention relates to the field of communication networks and, more specifically, to management of multicast trees.

BACKGROUND OF THE INVENTION

In general, Internet protocol (IP) multicast is used for distributing the same IP traffic to a plurality of user devices. In current systems, IP multicast uses join messages exchanged between routers in order to construct the IP multicast tree used for distributing the IP traffic. After a user device obtains a multicast address for accessing the multicast data, the user device uses a dedicated user-to-host protocol (e.g., multicast listener discovery (MLD) protocol for IPv6) to signal an associated access router indicating a request to join the multicast tree. The routers then use a router-to-router protocol (e.g., protocol independent multicast (PIM) for IPv6) to construct the multicast tree. Unfortunately, for complicated multicast trees, such router-to-router signaling may be quite complicated and expensive (e.g., in terms of router and network resource consumption).

Furthermore, existing multicast joins are complicated where a multicast tree crosses administrative domains. As such, existing multicast joins are quite complicated and unreliable for mobile user devices. For example, movement of a mobile user device between networks must be discovered by the networks and the movements must be communicated between routers. Unfortunately, such communication may be difficult where the associated routers are owned by different parties. Furthermore, while a mobile user device may initiate a multicast join on a new network, the mobile user device may not be able to send a multicast leave on the original network when his connection is dropped. This may result in a multicast tree in which IP traffic is distributed to routers to which a mobile user device is no longer connected.

SUMMARY OF THE INVENTION

Various deficiencies in the prior art are addressed through the invention of a method and apparatus for managing a multicast tree. Specifically, a method according to one embodiment of the invention comprises receiving at least one request for modifying the multicast tree where the at least one request is associated with at least one user device, determining at least one multicast tree change in response to the at least one request for modifying the multicast tree where the at least one multicast tree change is operable for modifying the multicast tree according to the at least one request, and generating at least one message operable for implementing the at least one multicast tree change, the at least one request and the at least one message implemented in a manner tending to minimize consumption of network resources.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is discussed in the context of an Internet Protocol (IP) communications network architecture comprising a plurality of routers; however, the present invention can be readily applied to other networks and network topologies. In general, the present invention enables establishment, management, and termination of multicast trees in a manner tending to minimize consumption of network resources. In one embodiment, the present invention uses signaling between user devices and a content provider server for requesting a modification of a multicast tree (e.g., a request to join the multicast tree, a request to remain associated with the multicast tree, a request to leave the multicast tree, a request to optimize an existing multicast tree, and the like).

In one embodiment, a multicast tree modification request is communicated using signaling tending to prevent consumption of network resources (e.g., network element processing resources, link capacity, and the like) which typically results from use of extensive router-to-router signaling to modify a multicast tree). For example, Session Initiation Protocol (SIP) signaling, Hypertext Transfer Protocol (HTTP) signaling, Simple Object Access Protocol (SOAP) signaling, and like signaling may be used for requesting a multicast tree change. As such, the present invention enables simpler, more efficient, and more reliable control over establishment, modification, and termination of multicast trees.

Figure 1:
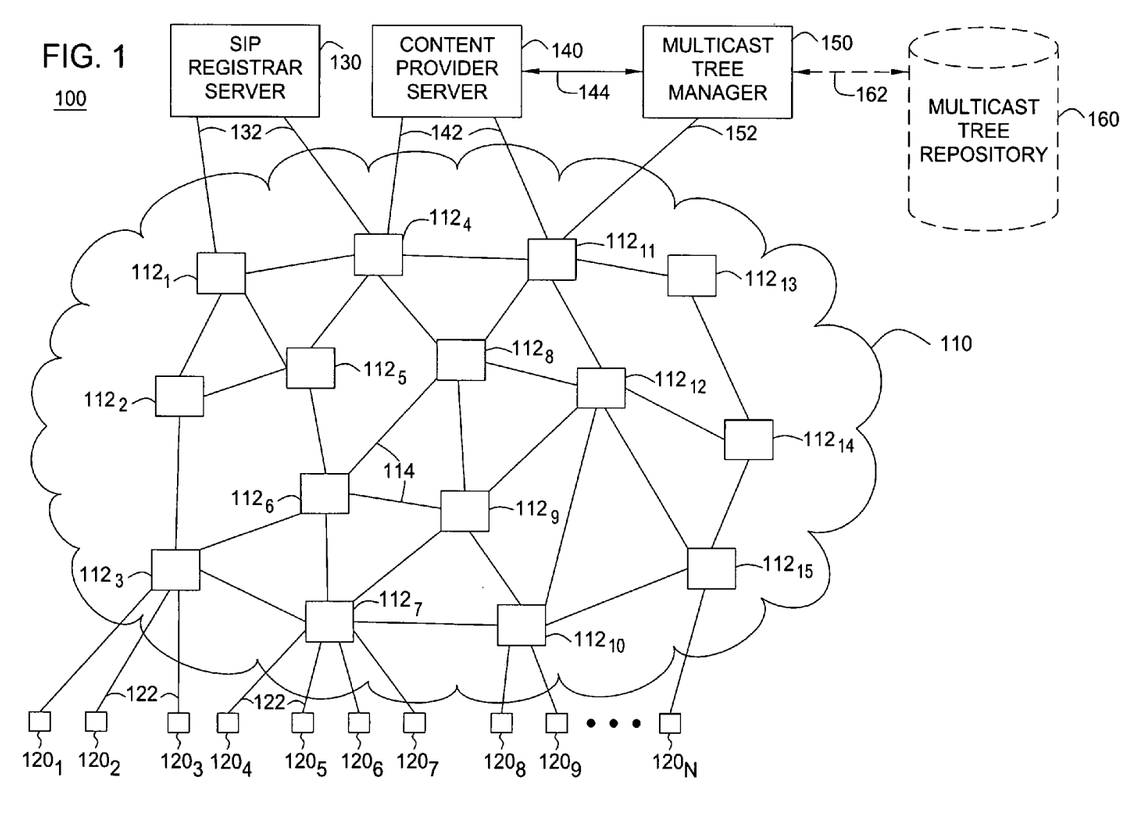
FIG. 1 depicts a high-level block diagram of a communications network architecture.

FIG. 1 depicts a high-level block diagram of a communications network architecture. Specifically, communications network architecture 100 of FIG. 1 comprises a network 110, a plurality of user devices (UDs) $120_1$-$120_N$ (collectively, UDs 120), a SIP registrar server (SRS) 130, a content provider server (CPS) 140, and a multicast tree manager (MTM) 150, and, optionally, a multicast tree repository (MTR) 160. The network 110 comprises a network operable for supporting at least one multicast tree. In one embodiment, as primarily described herein, network 110 comprises an IP network. In one further embodiment, network 110 comprises a network utilizing SIP signaling for communicating multicast tree change requests. Although not depicted, in another embodiment, at least one of Hypertext Transfer Protocol (HTTP) signaling, Simple Object Access Protocol (SOAP) signaling, and like signaling may be used for communicating multicast tree change requests.

As depicted in FIG. 1, network 110 comprises a plurality of network elements (NEs) $112_1$-$112_{15}$ (collectively, NEs 112) in communication using a plurality of communication links (CLs) 114 (collectively, CLs 114). In general, NEs 112 comprise network elements operable for supporting at least one multicast tree for distributing various content to UDs 120. In one embodiment, NEs 112 comprise routers. In one embodiment, although not depicted, network 110 may comprise various other network elements, network components, communication links, and the like.

As depicted in FIG. 1, UDs 120 comprise devices operable for establishing multicast sessions for receiving multicast content. As such, in one embodiment, UDs 120 comprise devices operable for transmitting information, receiving information, and displaying information to at least one user. In one embodiment, as primarily described herein, in which network 110 comprises an IP network, UDs 120 comprise IP phones, computers, and the like. In one further embodiment, in which network 110 utilizes SIP signaling, at least a portion of UDs 120 comprise SIP-UAs. As depicted in FIG. 1, UDs 120 access network 110 using a plurality of communication links (CLs) 122 (collectively, CLs 122). For example, UDs $120_1$, $120_2$, and $120_3$ access network 110 through NE $112_3$. Similarly, UDs $120_4$, $120_5$, $120_6$, and $120_7$ access network 110 through NE $112_7$. Similarly, UDs $120_8$ and $120_9$ access network 110 through NE $112_{10}$. Similarly, UD $120_N$ accesses network 110 via NE $112_{15}$.

In one embodiment, by transmitting multicast tree modification requests via CPS 140 using SIP signaling, HTTP signaling, SOAP signaling, and like signaling, the present invention obviates the need for the UDs 120 to support various multicast functions. For example, one such embodiment obviates the need for respective kernels of the UDs 120 to support multicast functions (e.g., support MLD protocol messaging). In this embodiment, following registration of a UD 120 through CPS 140, the UD 120 simply listens to the multicast IP address associated with the multicast group. As such, the present invention enables simplification of the UDs 120 while maintaining the capability of the UDs to join multicast groups, remain associated with multicast groups across different networks and administrative boundaries, leave multicast groups, and the like.

As depicted in FIG. 1, SRS 130 comprises a standard SIP registrar server. For example, SRS 130 performs client authentication (e.g., authenticating UDs 120). Although described herein as a standalone server, in one embodiment, the SIP registrar server function may be implemented on a server comprising SIP proxy and redirect functions. In one embodiment, UDs 120 establish connectivity to network 110 using standard SIP signaling with SRS 130. Similarly, in one embodiment, CPS 140 registers with SRS 130 for establishing at least one session between SRS 130 and CPS 140. As depicted in FIG. 1, SRS 130 accesses network 110 via NEs $112_1$ and $112_4$ using a plurality of communication links (CLs) 132 (collectively, CLs 132).

As depicted in FIG. 1, CPS 140 comprises a server operable for distributing content to at least a portion of the UDs 120 using at least one multicast tree. The CPS 140 accesses network 110 via NEs $112_4$ and $112_{11}$ using a plurality of communication links (CLs) 142 (collectively, CLs 142). Furthermore, CPS 140 communicates with MTM 150 via communication link (CL) 144. In one embodiment, as described herein, CPS 140 registers with SRS 130. The distribution of the multicast content from CPS 140 to at least a portion of the UDs 120 using a multicast tree is performed using at least one of a plurality of methods.

In one embodiment, CPS 140 distributes multicast content to at least a portion of the UDs 120 directly using network 110. In another embodiment, CPS 140 transmits the multicast content to at least one multicast server (not depicted) that multicasts the content stream to the UDs configured to receive the multicast content using the multicast tree. In one such embodiment, the multicast server is implemented as a standalone system in communication with CPS 140. In another such embodiment, the multicast server is co-located with one of CPS 140 and MTM 150. In another embodiment, CPS 140 transmits content to MTM 150, which then distributes the content to at least a portion of the UDs 120 using at least one multicast tree. In general, multicast content comprises various combinations of audio content, video content, and the like.

As depicted in FIG. 1, MTM 150 accesses network 110 via NE $112_{11}$, using communication link (CL) 152. In one embodiment, as depicted in FIG. 1, MTM 150 communicates with CPS 140 using CL 144. Similarly, MTM 150 may communicate with CPS 140 using network 110. Furthermore, MTM 150 optionally communicates with MTR 160 using a communication link (CL) 162. As depicted in FIG. 1, MTR 160 comprises a database operable for storing multicast tree configuration information. As such, in one embodiment, MTM 150 retrieves multicast tree configurations from MTR 160 using CL 162. Although not depicted, in another embodiment, MTR 160 is implemented as a portion of MTM 150 (not depicted).

As depicted in FIG. 1, MTM 150 comprises a system operable for managing (i.e., establishing, modifying, terminating, and the like) at least one multicast tree. Furthermore, in one embodiment, MTM 150 comprises a system operable for maintaining at least one multicast group associated with the at least one multicast tree. As such, in one embodiment, MTM 150 performs at least a portion of the methodologies of the present invention.

Although not depicted herein, in one embodiment, a plurality of content provider servers may be deployed. As such, in one embodiment, MTM 150 maintains a plurality of multicast trees. In one such embodiment, MTM 150 maintains an associated plurality of multicast groups (i.e., tracking the devices participating in the multicast tree). Furthermore, in another embodiment, at least a portion of the UDs 120 may operate as content provider servers for multicasting content to other of the UDs 120. Similarly, in this embodiment, MTM 150 maintains a plurality of multicast trees and an associated plurality of multicast groups.

Furthermore, although depicted and described herein as comprising specific numbers of networks 110, NEs 112, CLs 114, UDs 120, SRSs 130, CLs 132, CPSs 140, CLs 142, MTMs 150, CLs 152, MTRs 160, and CLs 162, those skilled in the art will appreciate that fewer or more networks 110, NEs 112, CLs 114, UDs 120, SRSs 130, CLs 132, CPSs 140, CLs 142, MTMs 150, CLs 152, MTRs 160 and CLs 162 may be used. Furthermore, the networks 110, NEs 112, CLs 114, UDs 120, SRSs 130, CLs 132, CPSs 140, CLs 142, MTMs 150, CLs 152, MTRs 160, and CLs 162 may be configured in a different manner. As such, the present invention is operable for establishing, managing, and terminating multicast trees in various networks irrespective of network size, network topology, and the like.

Figure 2:
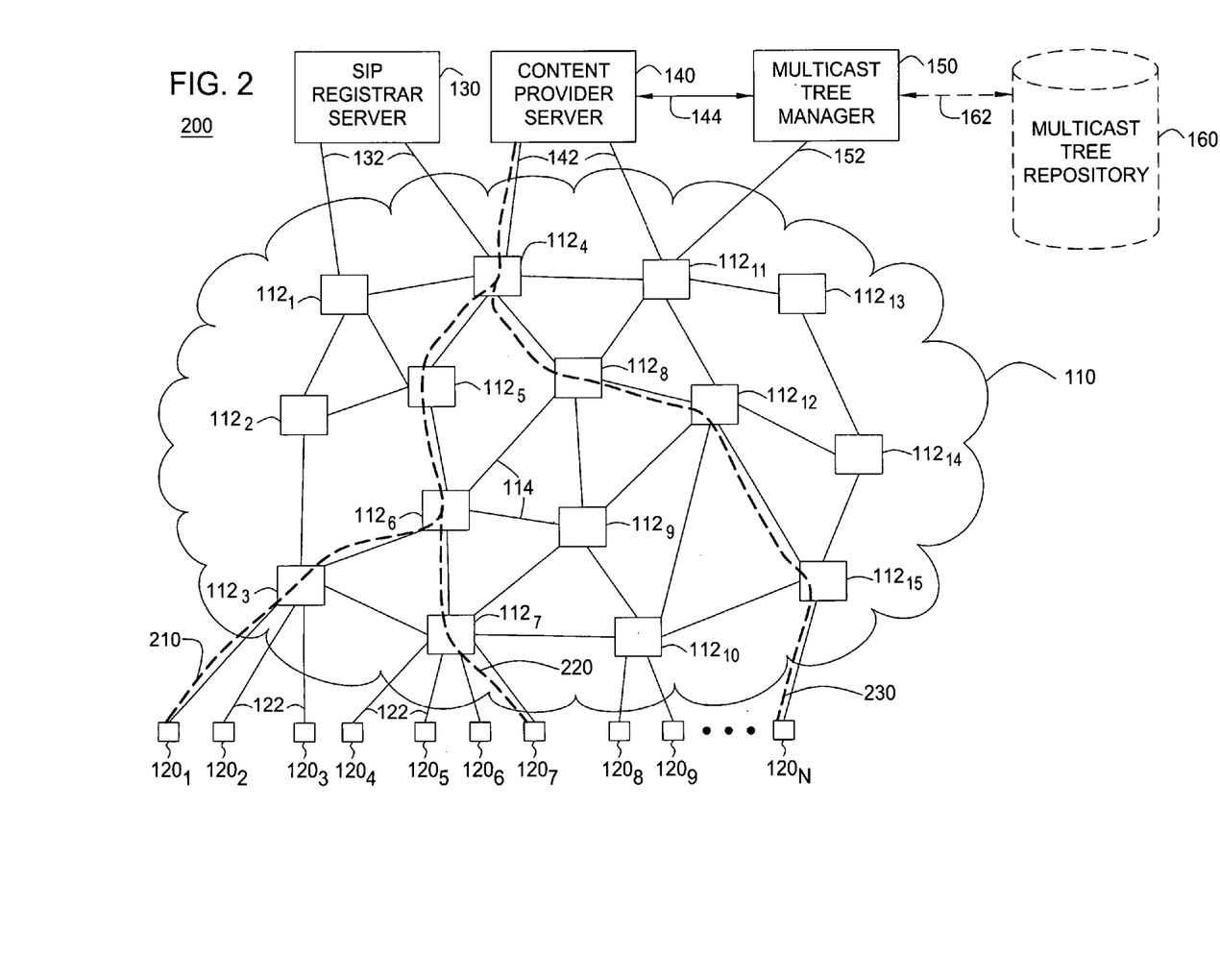
FIG. 2 depicts a multicast tree established in the communications network architecture of FIG. 1.

FIG. 2 depicts a multicast tree established in the communications network architecture of FIG. 1. Specifically, multicast tree 200 of FIG. 2 comprises a first multicast tree portion 210, a second multicast tree portion 220, and a third multicast three portion 230. The first multicast tree portion 210 comprises a communication path between CPS 140 and UD $120_1$ that traverses NEs $112_4$, $112_5$, $112_6$ and $112_3$. The second multicast tree portion 220 comprises a communication path between CPS 140 and UD $120_7$ that traverses NEs $112_4$, $112_5$, $112_6$ and $112_7$. The third multicast tree portion 230 comprises a communication path between CPS 140 and UD $120_N$ that traverses NEs $112_4$, $112_8$, $112_{12}$, and $112_{15}$.

As depicted in FIG. 2, first multicast tree portion 210, second multicast tree portion 220, and third multicast tree portion 230 share the communication path between CPS 140 and NE $112_4$. Similarly, first multicast tree portion 210 and second multicast tree portion 220 share the communication path between CPS 140 and NE $112_6$. The first multicast tree portion 210, second multicast tree portion 220 and third multicast three portion 230 each comprise a plurality of multicast tree segments. As such, a multicast tree configuration comprises communication paths (each communication path comprising at least one multicast tree segment) of which the multicast tree is composed.

As such, in one embodiment, a multicast tree configuration comprises the UDs (illustratively, UDs $120_1$, $120_7$, and $120_N$) configured to receive multicast content, the NEs traversed by the communication paths over which the content is transmitted, and the order in which the content traverses the NEs in the path from content source to content destination(s). In one embodiment, at least a portion of a multicast tree configuration is stored on MTM 150. In another embodiment, at least a portion of a multicast tree configuration is stored on MTR 160. For example, as depicted in FIG. 2, MTR 160 maintains a multicast tree configuration associated with multicast tree 200 of FIG. 2.

In one embodiment, a multicast tree (illustratively, multicast tree 200) is established by a management system (illustratively, MTM150). In one such embodiment, a multicast tree is established by MTM 150 using at least one message transmitted from MTM 150 to each of the NEs selected for carrying the distributed content (illustratively, NEs $112_4$, $112_5$, $112_6$, $112_7$, $112_8$, $112_{12}$, and $112_{15}$ for multicast tree 200 depicted and described with respect to FIG. 2). In one embodiment, configuration of an NE for supporting a multicast tree comprises updating at least one routing table associated with the NE. A method according to one embodiment for establishing a multicast tree is depicted and described herein with respect to FIG. 5.

Figure 3:
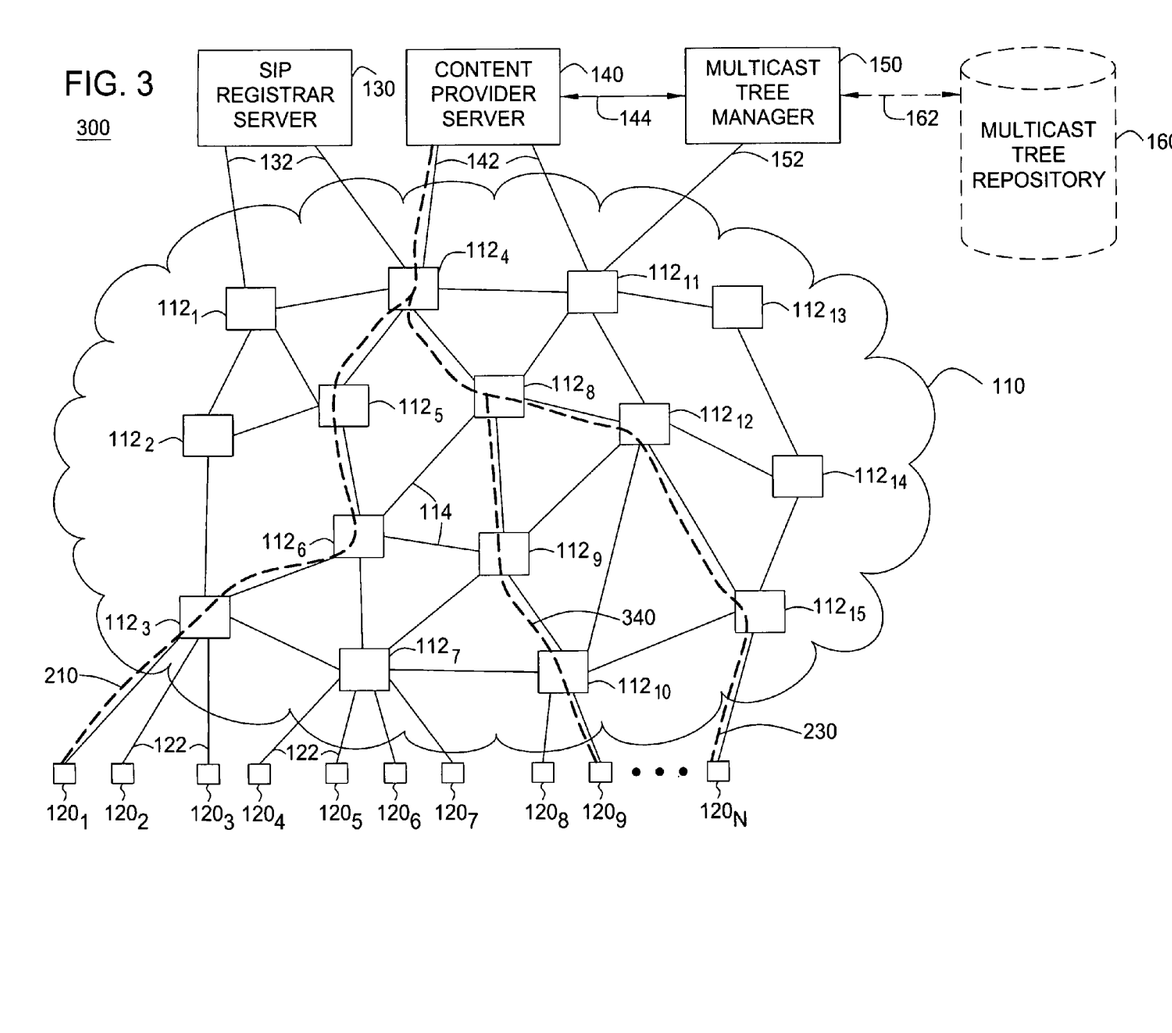
FIG. 3 depicts the multicast tree of FIG. 2 in which a user device has joined the multicast tree and a user device has left the multicast tree.

FIG. 3 depicts the multicast tree of FIG. 2, in which a user device has joined the multicast tree and a user device has left the multicast tree, thereby resulting in a modified multicast tree. Specifically, modified multicast tree 300 of FIG. 3 comprises first multicast tree portion 210, third multicast tree portion 230, and a fourth multicast tree portion 340. As depicted in FIG. 2 and FIG. 3, first multicast tree portion 210 comprises a communication path between CPS 140 and UD $120_1$ that traverses NEs $112_4$, $112_5$, $112_6$, and $112_3$. Similarly, as depicted in FIG. 2 and FIG. 3, third multicast tree portion 230 comprises a communication path between CPS 140 and UD $120_N$ that traverses NEs $112_4$, $112_8$, $112_{12}$, and $112_{15}$. The first multicast tree portion 210, third multicast tree portion 230, and fourth multicast tree portion 340 share a communication path between CPS 140 and NE $112_4$. Similarly, third multicast tree portion 230 and fourth multicast tree portion 340 share a communication path between CPS 140 and NE $112_8$ that traverses NE $112_4$.

As depicted in FIG. 3, fourth multicast tree portion 340 comprises a communication path between CPS 140 and UD $120_9$ (i.e., a user device that joined multicast tree 200) that traverses NEs $112_4$, $112_8$, $112_9$, and $112_{10}$. As such, modification of multicast tree 200 of FIG. 2 in response to a request by UD $120_9$ to join the multicast tree results in creation of a new multicast tree segment between NEs $112_8$ and $112_4$, creation of a new multicast tree segment between NEs $112_4$ and $112_{10}$, and creation of a new multicast tree segment between NE $112_{10}$ and UD $120_9$. In one embodiment, creation of new multicast tree segments is performed by MTM 150 using configuration messages to NEs $112_8$, $112_4$, and $112_{10}$. As such, as depicted in FIG. 3, UD $120_9$ is configured to receive multicast content from CPS 140.

Furthermore, it should be noted that second multicast tree portion 220 of FIG. 2 is not depicted in FIG. 3 (i.e., UD $120_7$ has left multicast tree 200). As such, modification of multicast tree 200 of FIG. 2 in response to a request by UD $120_7$ to leave the multicast tree results in termination of the second multicast tree portion 220 between NE $112_6$ and UD $120_7$ that traversed NE $112_7$. In other words, the request by UD $120_7$ to leave the multicast tree results in termination of the existing multicast tree segment between NEs $112_6$ and $112_7$ and termination of the existing multicast tree segment between NE$112_7$ and UD $120_7$. In one embodiment, termination of existing multicast tree segments is performed by MTM 150 using configuration messages to NEs $112_6$ and $112_7$. As such, as depicted in FIG. 3, UD $120_7$ is no longer configured to receive multicast content from CPS 140.

Figure 4:
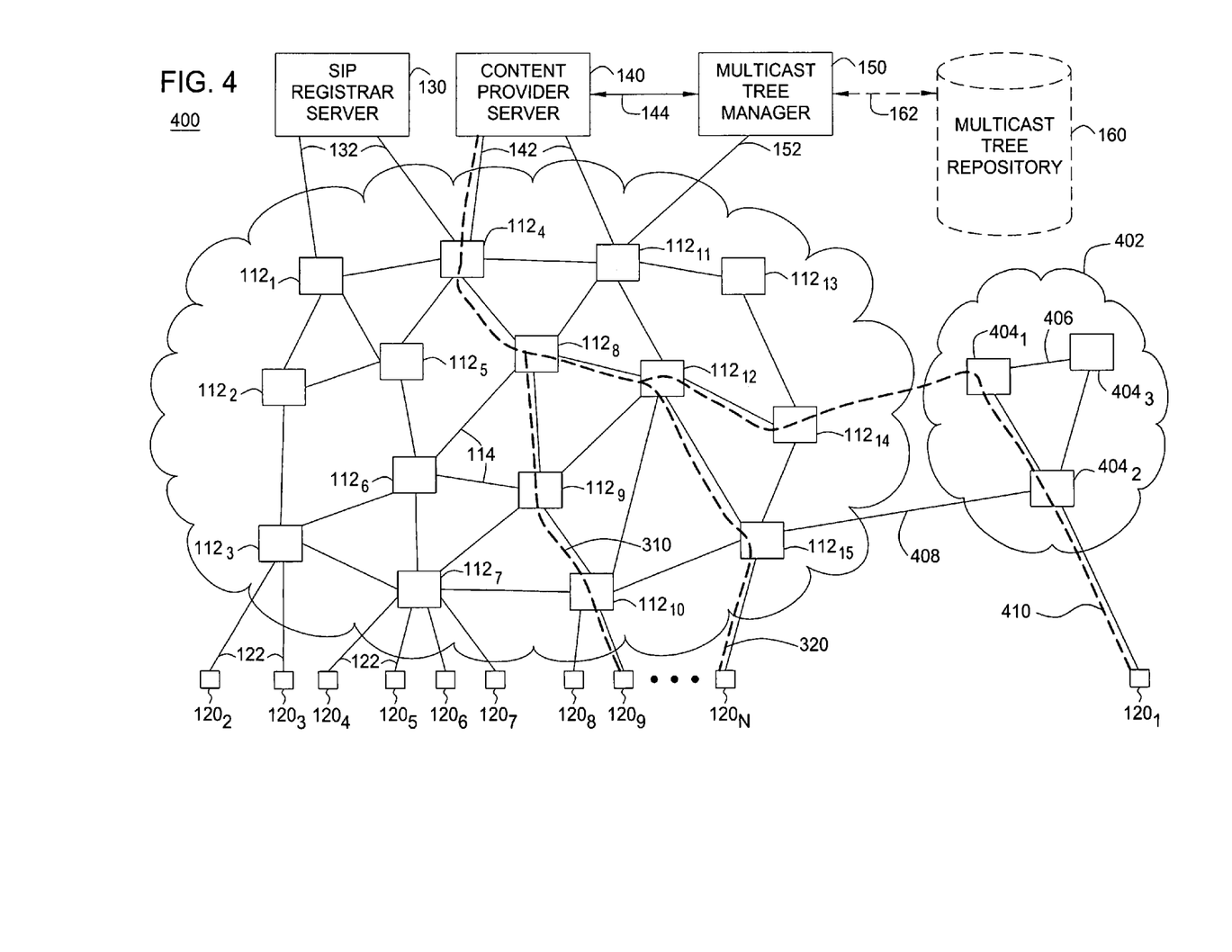
FIG. 4 depicts the multicast tree of FIG. 3 in which a user has moved from the communications network architecture of FIG. 1 to another network.

FIG. 4 depicts the multicast tree of FIG. 3, in which a mobile user device has moved from the communications network architecture of FIG. 1 to another network. As depicted in FIG. 4, UD $120_1$ accesses network 110 via an access network 402. The access network 402 comprises a plurality of network elements (NEs) $404_1$-$404_3$ (collectively, NEs 404) in communication using a plurality of communication links (CLs) 406 (collectively, CLs 406). As depicted in FIG. 4, NEs 404 of AN 402 communicate with a portion of NEs 112 of network 110 using a plurality of communication links (CLs) 408 (collectively, CLs 408). Furthermore, UD $120_1$ accesses AN 402 using an associated communication link (CL) 410.

As depicted in FIG. 4, modified multicast tree 400 comprises a modified first multicast tree portion 410, third multicast tree portion 230, and fourth multicast tree portion 340. As depicted in FIG. 3 and FIG. 4, third multicast tree portion 230 comprises a communication path between CPS 140 and UD $120_N$ that traverses NEs $112_4$, $112_8$, $112_{12}$, and $112_{15}$, and fourth multicast tree portion 340 comprises a communication path between CPS 140 and UD $120_9$ that traverses NEs $112_4$, $112_8$, $112_{14}$, and $112_{10}$. Furthermore, as depicted in FIG. 4, modified first multicast tree portion 410 comprises a communication path between CPS 140 and UD $120_1$ that traverses NEs $112_4$, $112_8$, $112_{12}$, $112_{14}$, $404_1$, and $404_2$.

As such, since UD $120_1$ is associated with a different access network, the communication path between CPS 140 and UD $120_1$ that traversed NEs $112_4$, $112_5$, $112_6$, and $112_3$ has been replaced with a communication path between CPS 140 and UD $120_1$ that traverses NEs $112_4$, $112_8$, $112_{12}$, $112_{14}$, $404_1$, and $404_2$. The modification of multicast tree 300 of FIG. 3 in response to the movement of UD $120_1$ between networks comprises termination of existing multicast tree segments between NEs $112_4$ and $112_5$, between NEs $112_5$ and $112_6$, between NEs $112_6$ and $112_3$, and between NE $112_3$ and UD $120_1$. Similarly, modification of multicast tree 300 of FIG. 3 in response to movement of UD $120_1$ between networks comprises creation of new multicast tree segments between NEs $112_{12}$ and $112_{14}$, between NEs $112_{14}$ and $404_1$, between NEs $404_1$ and $404_2$, and between NE $404_2$ and UD $120_1$.

As depicted in FIG. 4, a portion of first multicast tree portion 210 between NE $112_4$ and UD $120_1$ that traversed NEs $112_5$, $112_6$, and $112_3$ has been terminated (e.g., by MTM 150 using at least one configuration message to NEs $112_5$, $112_6$, and $112_3$). As such, a portion of modified first multicast tree portion 410 comprises a portion of first multicast tree portion 210 between CPS 140 and NE $112_4$. Furthermore, a portion of modified first multicast tree portion 410 between NE1128 and UD $112_1$ that traverses NEs $112_8$, $112_{12}$, $112_{14}$, and $404_2$ has been established (e.g., by MTM 150 using at least one configuration message to NEs $112_8$, $112_{12}$, $112_{14}$, and $404_2$). As such, modified first multicast tree portion 410, third multicast tree portion 230, and fourth multicast tree portion 340 share a communication path between CPS 140 and NE $112_8$. Similarly, first modified multicast tree portion 410 and third multicast tree portion 230 share a communication path between NE $112_8$ and NE $112_{12}$.

As such, the multicast tree configuration associated with multicast tree 300 of FIG. 3 has been modified to a multicast tree configuration associated with multicast tree 400 of FIG. 4. In one embodiment, as described herein, at least a portion of the multicast tree configuration associated with multicast tree 400 of FIG. 4 is stored by at least one of CPS 140, MTM 150, and MTR 160. In one such embodiment, for example, a plurality of multicast tree changes determined by MTM 150 are communicated to MTR 160 and maintained by MTR 160. A method according to one embodiment for modifying a multicast tree in response to movement of a user device from between access networks is depicted and described herein with respect to FIG. 5.

Figure 5:
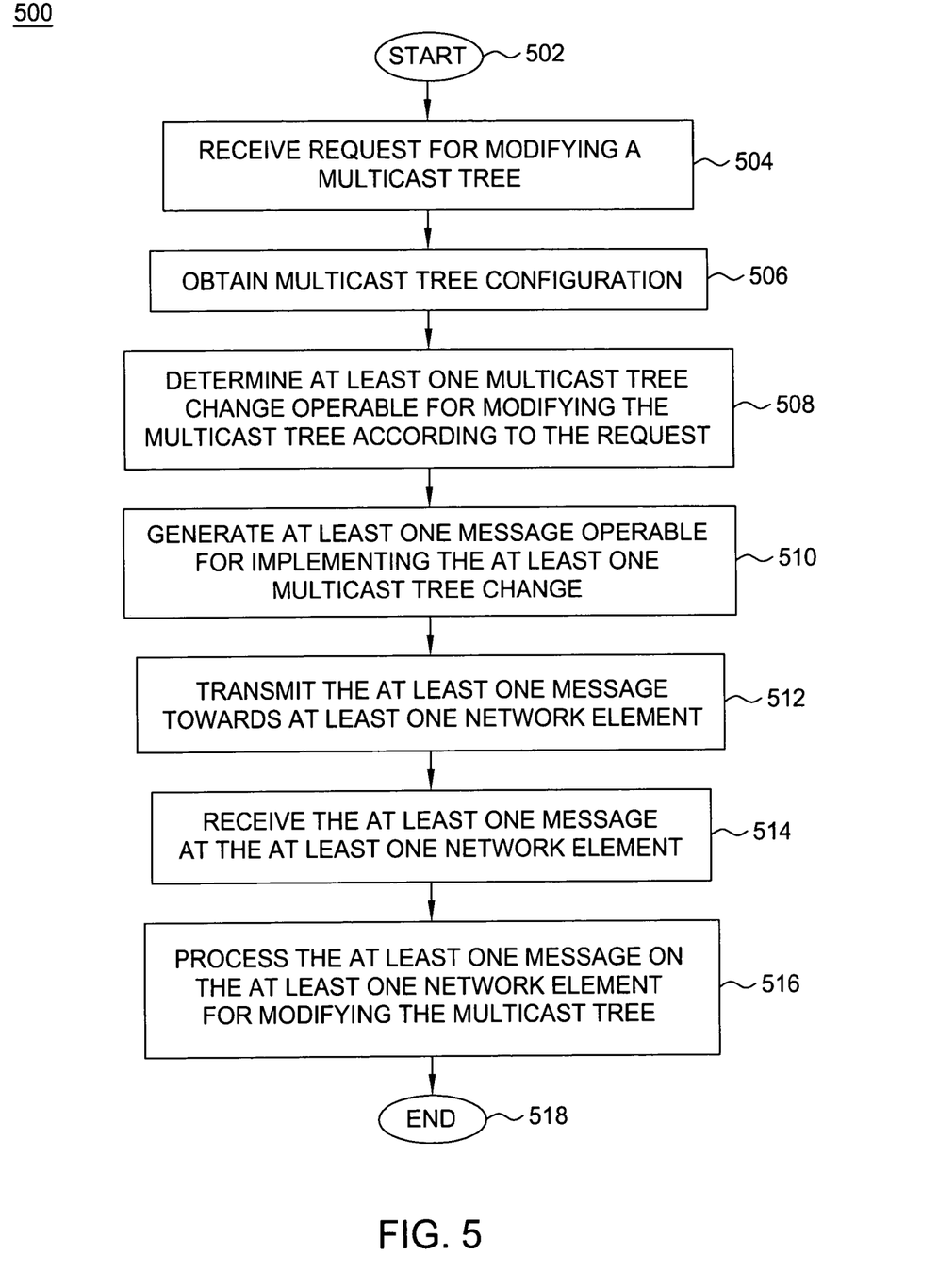
FIG. 5 depicts a flow diagram of a method according to one embodiment of the invention.

FIG. 5 depicts a flow diagram of a method according to one embodiment of the invention. Specifically, method 500 of FIG. 5 comprises a method for managing a multicast tree. In one embodiment, at least a portion of the steps of method 500 may be used for establishing and terminating a multicast tree. Furthermore, although described within the context of an IP network utilizing SIP signaling, method 500 may be used for establishing, managing, and terminating a multicast tree in networks utilizing various other signaling protocols (e.g., HTTP, SOAP, and the like). Although depicted as being performed serially, those skilled in the art will appreciate that at least a portion of the steps of method 500 may be performed contemporaneously, or in a different order than presented in FIG. 5. The method 500 begins at step 502 and proceeds to step 504.

At step 504, a request for modifying a multicast tree is received. In one embodiment, a request for modifying a multicast tree is received in response to a request by a UD to join the multicast tree. In similar embodiment, a request for modifying a multicast tree is received in response to a request by a content provider to provide content to a UD (i.e., a content provider server requests that the UD join the multicast tree). In another embodiment, the request for modifying a multicast tree is received in response to a request by a UD to remain associated with the multicast tree (e.g., a UD moves between access networks). In another embodiment, the request for modifying a multicast tree is received in response to a request to leave the multicast tree (i.e., a request by a UD to not receive content from CPS 140).

In one embodiment, in which the multicast tree modification request comprises a request to join a multicast tree, the multicast tree modification request may be initiated by at least one of a plurality of network components. In one embodiment, as described herein, a content distribution request is initiated by a UD. For example, a user SIP-UA may transmit a SIP INVITE message to the SIP address of a content provider server (illustratively, CPS 140) for modifying the multicast tree (i.e., modifying the multicast tree to enable the UD to receive the distributed content). In another embodiment, as described herein, a content distribution request is initiated by a content server (illustratively, CPS 140). For example, CPS 140 may transmit a SIP INVITE message to the SIP address of a UD (i.e., a user SIP-UA) for modifying the multicast tree (i.e., modifying the multicast tree to enable the UD to receive the distributed content).

In another embodiment, in which the multicast tree modification request comprises a request to remain associated with the multicast tree, the user SIP-UA may transmit a SIP RE-INVITE message to CPS 140 for modifying the multicast tree (i.e., modifying the multicast tree to enable a UD to continue to receive the distributed content seamlessly). In another embodiment, in which the multicast tree modification request comprises a request to leave the multicast tree, the SIP-UA (i.e., UD) may transmit a SIP BYE message to CPS 140 for modifying the multicast tree (i.e., removing that UD from the multicast tree).

In such embodiments, acceptance of a content distribution request triggers signaling between CPS 140 and SRS 130, as well as between SRS 130 and a UD 120 for registering the UD with the network. In one embodiment, SIP signaling between SRS 130 and the UD 120 comprises an exchange of coder-decoder (CODEC) information. In one embodiment, for example, CODEC information may comprise the CODEC used by CPS 140 to distribute the IP multicast traffic using the multicast tree (i.e., to notify the UD 120 of the CODEC required for processing the received multicast content). In another embodiment, for example, CODEC information may comprise at least one CODEC to which various content adaptation nodes in the multicast tree are capable of transcoding.

In one embodiment, a multicast tree modification request is received by MTM 150. In one such embodiment, the multicast tree modification request is received from one of the UDs 120 via at least a portion of the NEs 112. In another such embodiment, the multicast tree modification request is received from CPS 140. In one further embodiment (not depicted) the multicast tree modification request is received from at least one remote system in communication with MTM 150. For example, a request by a UD associated with a remote network (illustratively, AN 402) to access a multicast tree managed by MTM 150 may be received from at least one of a management system associated with the remote network, a SIP registrar server associated with the remote network, and like network components.

At step 506, a multicast tree configuration is obtained. In one embodiment, as described herein, a multicast tree configuration comprises at least one communication path of which the multicast tree is composed. In one further embodiment, a multicast tree configuration comprises at least multicast tree segment of which the at least one communication path is composed. For example, as depicted in FIG. 2, a multicast tree configuration for first multicast tree portion 210 comprises each segment in the communication path between CPS 140 and UD $120_1$ (i.e., a segment from CPS 140 to NE $112_4$, a segment from NE $112_4$ to NE $112_5$, a segment from NE $112_5$ to NE $112_6$, and a segment from NE $112_6$ to NE $112_3$, and a segment from NE $112_3$ to UD $120_1$).

In one embodiment, a multicast tree configuration is obtained by a multicast tree management system (illustratively, MTM 150). In one such embodiment, the multicast tree configuration is obtained from at least one of a local database, local memory, and like storage components as known in the art. In another such embodiment, the multicast tree configuration is obtained from at least one remote database operable for storing multicast tree configurations (illustratively, MTR 160). In another such embodiment, the multicast tree configuration is obtained from the network (e.g., using a network discovery function).

In another embodiment, a multicast tree configuration is obtained by a content provider server (illustratively, CPS 140). For example, in one such embodiment, a multicast tree configuration is available to CPS 140 implicitly through an active session (e.g., a SIP session) between the UDs 120 and CPS 140. For example, such a SIP session operable for enabling CPS 140 to determine the multicast tree configuration may comprise the respective SIP sessions established for communicating respective multicast tree modification requests. In one embodiment, in which a multicast tree is being established, a multicast tree configuration is not obtained.

At step 508, at least one multicast tree change is determined. In one embodiment, the at least one multicast tree change is operable for modifying the multicast tree according to the multicast tree modification request. In one embodiment, a multicast tree change is determined by a content provider server (illustratively, CPS 140). In one such embodiment, the multicast tree change is communicated to MTM 150. In another embodiment, a multicast tree change is determined by a management system in communication with a content provider server that received the multicast tree modification request (illustratively, MTM 150)

In one embodiment, in which the multicast tree modification request comprises a request to join a multicast tree, a multicast tree change comprises creating at least one multicast tree segment in the multicast tree. In another embodiment, in which the multicast tree modification request comprises a request to remain associated with the multicast tree, a multicast tree change comprises at least one of creating at least one multicast tree segment in the existing multicast tree and terminating at least one multicast tree segment from the existing multicast tree. In another embodiment, in which the multicast tree modification request comprises a request to leave the multicast tree, a multicast tree change comprises terminating at least one multicast tree segment of the existing multicast tree.

For example, as depicted with respect to FIG. 2 and FIG. 3, the request by UD 120$_9$ to join the multicast tree requires addition of a multicast tree segment between NEs 112$_8$ and 112$_9$, addition of a multicast tree segment between NEs 112$_9$ and 112$_{10}$, and addition of a multicast tree segment between NE 112$_{10}$ and UD 120$_9$. Similarly, for example, as depicted with respect to FIG. 2 and FIG. 3, a request by UD 120$_7$ to leave the multicast tree requires removal of the multicast tree segment between NEs 112$_6$ and 112$_7$ and removal of the multicast tree segment between NE 112$_7$ and UD 120$_7$.

For example, with respect to FIG. 3 and FIG. 4, the request by UD 120$_1$ to remain associated with the multicast tree (despite movement of UD 120$_1$ to a different access network) requires removal of the multicast tree segments between NEs 112$_4$ and 112$_5$, NEs 112$_5$ and 112$_6$, NEs 112$_6$ and 112$_3$, and NE 112$_3$ and UD 120$_1$. Furthermore, the request by UD 120$_1$ to remain associated with the multicast tree requires addition of a multicast tree segment between NEs 112$_{12}$ and 112$_{14}$, addition of a multicast tree segment between NEs 112$_{14}$ and 404$_1$, addition of a multicast tree segment between NEs 404$_1$ and 404$_2$, and addition of a multicast tree segment between NE 404$_2$ and UD 120$_1$.

In one embodiment, the at least one multicast tree change is determined by a content provider server (illustratively, CPS 140). In another embodiment, the at least one multicast tree change is determined by a multicast tree management system (illustratively, MTM 150). In one embodiment, the at least one multicast tree change is determined using the multicast tree configuration and the request for modifying the multicast tree. In one embodiment, determining the at least one multicast tree comprises at least one of: determining a portion of the existing multicast tree that may be reused, determining a new portion of the multicast tree that is required (e.g., for a request to join the multicast tree, or a request to remain associated with the multicast tree), and determining a portion of the multicast tree that is no longer required (i.e., for a request to remain associated with the multicast tree, or a request to leave the multicast tree).

At step 510, at least one message operable for implementing the at least one multicast tree change is generated. In one embodiment, the at least one message is generated by a management system (illustratively, the MTM 150). In one embodiment, the at least one message is operable for modifying at least one multicast routing table stored on at least one router (illustratively, at least one of the NEs 112). In one embodiment, generation of the messages is performed in a manner independent of the protocol used for transmitting the messages. In aone embodiment, at least one of a plurality of communication protocols may be used for generating messages for implementing the at least one multicast tree change.

For example, as depicted with respect to FIG. 2 and FIG. 3, the request by UD 120$_9$ to join the multicast tree triggers generation of messages for modifying respective multicast routing tables on NEs 112$_8$, 112$_9$, and 112$_{10}$ to enable distribution of content from CPS 140 to UD 120$_9$. Similarly, for example, as depicted with respect to FIG. 2 and FIG. 3, the request by UD 120$_7$ to leave the multicast tree triggers generation of messages for modifying respective multicast routing tables on NEs 112$_6$ and 112$_7$ to prevent distribution of content from CPS 140 to UD 120$_7$. For example, with respect to FIG. 3 and FIG. 4, the request by UD 120$_1$ to remain associated with the multicast tree (despite movement of UD 120$_1$ to a different access network) triggers generation of messages for modifying respective multicast routing tables on NEs 112$_6$, 112$_3$, 112$_{12}$, 112$_{14}$, 404$_1$, and 404$_2$ to transfer the communication path supporting distribution of content from CPS 140 to UD 120$_1$.

At step 512, the at least one message is transmitted towards at least one network element (illustratively, one of the NEs 112). In one embodiment, the at least one message is transmitted by an associated management system (illustratively, MTM 150). In another embodiment, the at least one message is transmitted by the content provider server distributing the multicast content (illustratively, CPS 140). In one embodiment, transmission of the at least one message is performed using at least one communication protocol. For example, in one embodiment, an extension of the Common Open Policy Service (COPS) protocol.

For example, with respect to FIG. 2 and FIG. 3, in response to the request by UD 120$_9$ to join the multicast tree, MTM 150 transmits a message to NE 112$_8$ operable for modifying a multicast routing table stored on NE 112$_8$ for configuring NE 112$_8$ to transmit the multicast content received from CPS 140 to NE 112$_4$. Similarly, MTM 150 transmits a message to NE 112$_9$ operable for modifying a multicast routing table stored on NE 112$_9$ for configuring NE 112$_9$ to forward multicast content received from CPS 140 to NE 112$_{10}$. Similarly, MTM 150 transmits a message to NE 112$_{10}$ operable for modifying a multicast routing table stored on NE 112$_{10}$ for configuring NE 112$_{10}$ to forward multicast content received from CPS 140 to UD 120$_9$.

At step 514, the at least one message is received by the at least one network element. At step 516, the at least one message is processed on the at least one network element for modifying the multicast tree according to the request. As described herein, in one embodiment, processing of the at least one message comprises modifying at least one multicast table maintained on the network element. In one embodiment, the message generated and transmitted by MTM 150, and received and processed by the respective NEs 112, comprise COPS messages. The method 500 then proceeds to step 518, where the method 500 ends.

It is contemplated that at least a portion of the described functions may be combined into fewer functional devices. Similarly, it is contemplated that the various functions may be performed by other functional devices, and that the various functions may be distributed across the various functional devices in a different manner. For example, at least a portion of the functions described herein with respect to the MTM 150 may be implemented as a portion of at least one of the NEs 112, SRS 130, and CPS 140. Similarly, at least a portion of the functions described herein with respect to CPS 140 may be implemented as a portion of MTM 150.

Furthermore, although primarily described herein with respect to use of SIP signaling for communicating requests for modifying a multicast tree (e.g., a request to join a multicast tree, a request to remain associated with a multicast tree, a request to leave a multicast tree, and the like), in one embodiment, other types of signaling may be used. For example, HTTP signaling, SOAP signaling, and the like may be used. Furthermore, although described herein with respect to an IP network, those skilled in the art will appreciate that the methodologies of the present invention may be used for establishing, managing, and terminating multicast trees in various other networks and associated network topologies.

Figure 6:
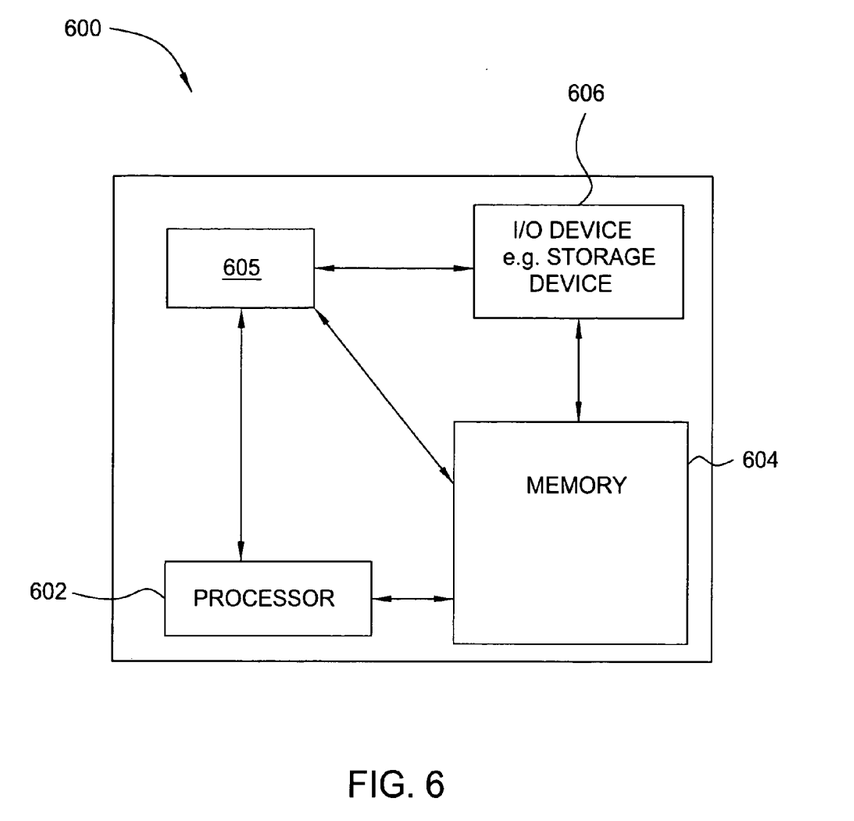
FIG. 6 depicts a high-level block diagram of a general-purpose computer suitable for use in performing the functions described herein.

FIG. 6 depicts a high level block diagram of a general purpose computer suitable for use in performing the functions described herein. As depicted in FIG. 6, system 600 comprises a processor element 602 (e.g., a CPU), a memory 604, e.g., random access memory (RAM) and/or read only memory (ROM), a multicast tree management module 605, and various input/output devices 606 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present multicast tree management module or process 605 can be loaded into memory 604 and executed by processor 602 to implement the functions as discussed above. As such, multicast tree management process 605 (including associated data structures) of the present invention can be stored on a computer readable medium or carrier, e.g., RAM memory, magnetic or optical drive or diskette and the like.

Although various embodiments which incorporate the teachings of the present invention have been shown and described in detail herein, those skilled in the art can readily devise many other varied embodiments that still incorporate these teachings.

What is claimed is:

1. A method for managing a multicast tree using a multicast tree manager, the multicast tree adapted for conveying multicast content toward at least one user device via a network comprising a plurality of network elements, the method comprising:

receiving, by said multicast tree manager, a request to modify said multicast tree, wherein said request is associated with a user device, wherein said request is received from a content server, wherein said content server is configured to provide multicast content for distribution over said multicast tree, wherein said multicast tree is configured to convey said multicast content toward said at least one user device;

determining, by said multicast tree manager, at least one multicast tree change for modifying said multicast tree in a manner enabling seamless distribution of said multicast content toward said at least one user device in response to a movement of said at least one user device from a first network to a second network; and generating, by said multicast tree manager, at least one message for implementing said at least one multicast tree change within said network, said at least one message comprising information for modifying at least one routing table of at least one of said network elements based on said at least one multicast tree change.

2. The method of claim 1, wherein said determining said at least one multicast tree change comprises:

obtaining said multicast tree configuration associated with said multicast tree, wherein said multicast tree configuration is obtained from at least one of said content server and said multicast tree manager.

3. The method of claim 1, wherein said at least one multicast tree change is determined in a manner for maximizing a reuse of multicast tree segments of said multicast tree configuration.

4. The method of claim 1, wherein said at least one multicast tree change is adapted for modifying said multicast tree in a manner enabling distribution of content toward said user device.

5. The method of claim 1, wherein said at least one multicast tree change is adapted for modifying said multicast tree in a manner preventing distribution of said multicast content toward said user device.

6. The method of claim 1, wherein said at least one multicast tree change comprises at least one of:

creating at least one new multicast tree segment; and
terminating at least one existing multicast tree segment.

7. The method of claim 1, further comprising:

transmitting said at least one message towards said at least one of said network elements.

8. The method of claim 7, further comprising:

receiving said at least one message at said at least one of said network elements; and processing said at least one message for modifying said at least one routing table stored on said at least one of said network elements according to at least one of said at least one multicast tree change.

9. The method of claim 1, wherein said request comprises at least one of a request by said user device to join said multicast tree, a request by said user device to leave said multicast tree, a request by said user device to move from a first network to a second network, a request by said content server to said user device, and a request by at least one network component to optimize said multicast tree.

10. The method of claim 1, wherein said request to modify said multicast tree is associated with signaling between said user device and said content server, wherein said signaling between said user device and said content server is performed using at least one of Session Initiation Protocol (SIP) signaling, Hypertext Transfer Protocol (HTTP) signaling, and Simple Object Access Protocol (SOAP) signaling.

11. A non-transitory computer readable storage medium storing a software program, that, when executed by a computer, causes the computer to perform method for managing a multicast tree using a multicast tree manager, the multicast tree adapted for conveying multicast content toward at least one user device via a network comprising a plurality of network elements, the method comprising:

receiving, by said multicast tree manager, a request to modify said multicast tree, wherein said request is associated with a user device, wherein said request is received from a content server, wherein said content server is configured to provide multicast content for distribution over said multicast tree, wherein said multicast tree is configured to convey said multicast content toward said at least one user device;

determining, by said multicast tree manager, at least one multicast tree change for modifying said multicast tree in a manner enabling seamless distribution of said multicast content toward said at least one user device in response to a movement of said at least one user device from a first network to a second network; and generating, by said multicast tree manager, at least one message for implementing said at least one multicast tree change within said network, said at least one message comprising information for modifying at least one routing table of at least one of said network elements based on said at least one multicast tree change.

12. The non-transitory computer readable storage medium of claim 11, wherein said determining said at least one multicast tree change comprises:

obtaining said multicast tree configuration associated with said multicast tree, wherein said multicast tree configuration is obtained from at least one of said content server and said multicast tree manager.

13. The non-transitory computer readable storage medium of claim 11, wherein said at least one multicast tree change is determined in a manner for maximizing a reuse of multicast tree segments of said multicast tree configuration.

14. The non-transitory computer readable storage medium of claim 11, said at least one multicast tree change for at least one of modifying said multicast tree in a manner enabling distribution of said multicast content toward said device and modifying said multicast tree in a manner preventing distribution of content toward said user device.

15. An apparatus for managing a multicast tree using a multicast tree manager, the multicast tree adapted for conveying multicast content toward at least one user device via a network comprising a plurality of network elements, the apparatus comprising:

means for receiving a request to modify said multicast tree, wherein said request is associated with a user device, wherein said request is received from a content server, wherein said content server is configured to provide multicast content for distribution over said multicast tree, wherein said multicast tree is configured to convey said multicast content toward said at least one user device;

means for determining, by said multicast tree manager, at least one multicast tree change for modifying said multicast tree in a manner enabling seamless distribution of said multicast content toward said at least one user device in response to a movement of said at least one user device from a first network to a second network; and means for generating at least one message for implementing said at least one multicast tree change within said network, said at least one message comprising information for modifying at least one routing table of at least one of said network elements based on said at least one multicast tree change.

16. The apparatus of claim 15, wherein said means for determining said at least one multicast tree change comprises:

means for obtaining said multicast tree configuration associated with said multicast tree, wherein said multicast tree configuration is obtained from at least one of said content server and said multicast tree manager.

17. The apparatus of claim 15, wherein said at least one multicast tree change is determined in a manner for maximizing a reuse of multicast tree segments of said multicast tree configuration.

18. The method of claim 1, wherein said request is initiated by said content server.

19. The method of claim 1, wherein said request is initiated by said user device.

20. The method of claim 1, further comprising:

transmitting said at least one message from said multicast tree manager toward said at least one of said network elements.

21. The method of claim 1, further comprising:

transmitting said at least one message from said multicast tree manager toward said content server, wherein said content server is configured to transmit said at least one message toward said at least one of said network elements.

22. The method of claim 1, wherein the content server is registered with a Session Initiation Protocol (SIP) registrar server.

* * * * *